United States Patent [19]
Ballonez

[11] Patent Number: 5,607,127
[45] Date of Patent: Mar. 4, 1997

[54] SHOWER PIPE SUPPORT

[76] Inventor: Joe J. Ballonez, 2228 Patton St., Delano, Calif. 93215

[21] Appl. No.: 503,157

[22] Filed: Jul. 17, 1995

[51] Int. Cl.$^6$ .................................................. F16L 3/24
[52] U.S. Cl. ................................................ 248/72; 4/596
[58] Field of Search ............................. 248/72, 73, 74.1, 248/65, 219.4, 218.4, 231.71, 229.15, 70; 4/567, 570, 596, 599, 600, 615, 617; 403/363, 337

[56] References Cited

U.S. PATENT DOCUMENTS

| | | | |
|---|---|---|---|
| 1,384,533 | 7/1921 | Wood | 248/70 |
| 2,537,437 | 1/1951 | Aaby | 248/57 |
| 2,661,483 | 12/1953 | Tortorice | 4/695 |
| 2,886,269 | 5/1959 | Carlson | 248/70 |
| 3,387,812 | 6/1968 | Thoms . | |
| 3,606,217 | 9/1971 | Leiferman | 248/57 |
| 4,141,524 | 2/1979 | Corvese | 248/70 |
| 4,411,425 | 10/1983 | Milnar | 272/123 |
| 4,993,670 | 2/1991 | Tesar | 248/68.1 |
| 5,044,584 | 9/1991 | Lin | 248/68.1 |
| 5,215,281 | 6/1993 | Sherman | 248/219.4 X |

*Primary Examiner*—Ramon O. Ramirez
*Attorney, Agent, or Firm*—Kenneth J. Hovet

[57] ABSTRACT

A pipe support for use in securing a shower head water supply pipe to the upper edge of a shower enclosure wall. The support includes a body portion which spans the distance between the shower wall and supply pipe. A clamp flange extends upwardly from a rear corner of the body portion and a bifurcated wall flange extends downwardly from the forward corner of the body portion. The wall flange comprises an inner arm which is spaced apart from an outer arm a distance slightly greater than the thickness of the shower wall. The pipe support is slipped over the upper edge of the shower wall and the water supply pipe is then clamped against the upwardly extending clamp flange. The pipe support may comprise a unitary molded piece or an assembly of three angular members.

15 Claims, 1 Drawing Sheet

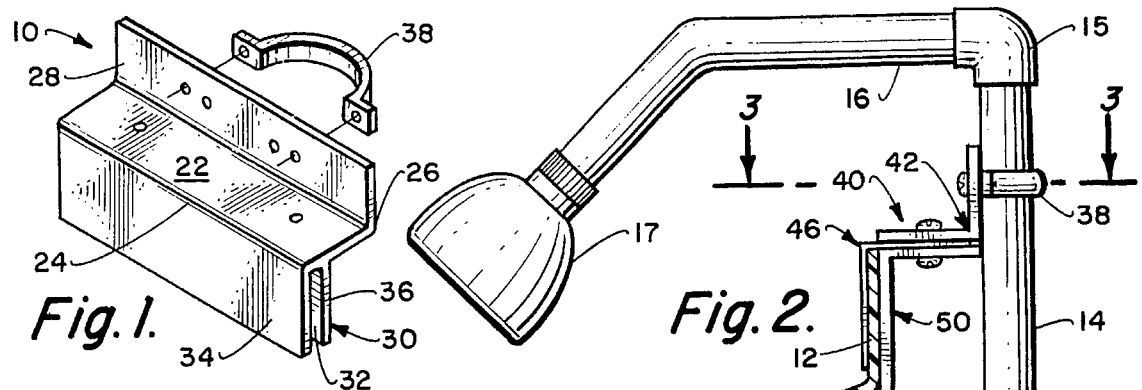
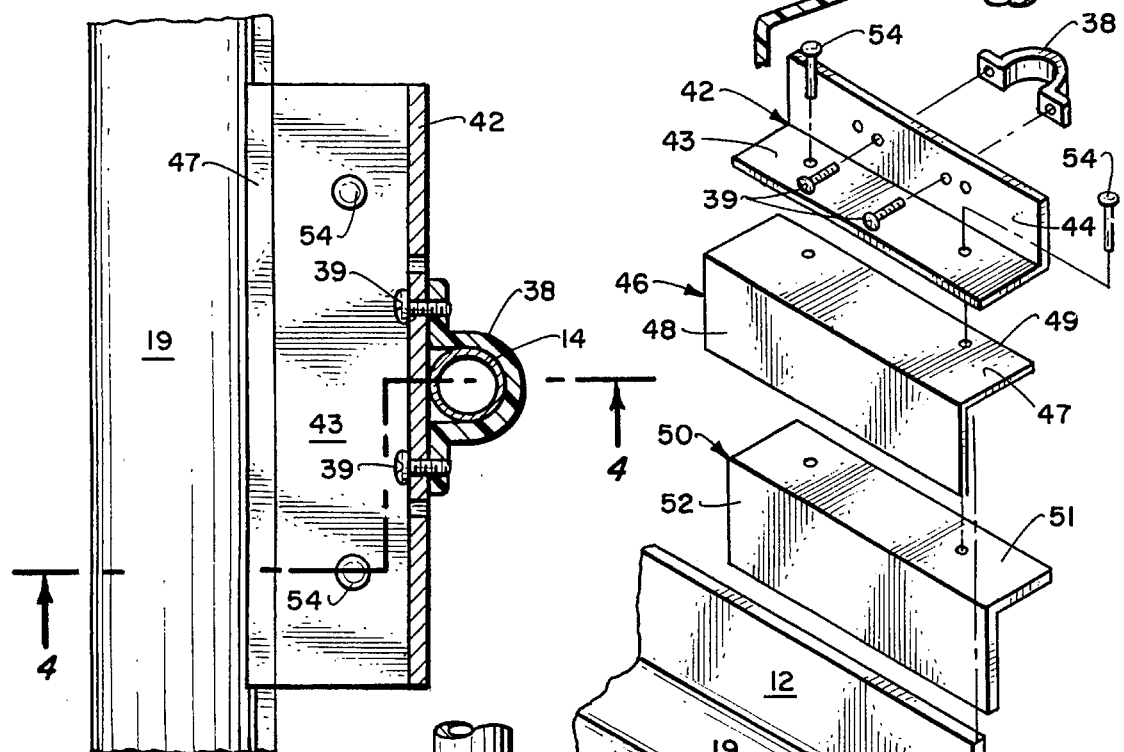
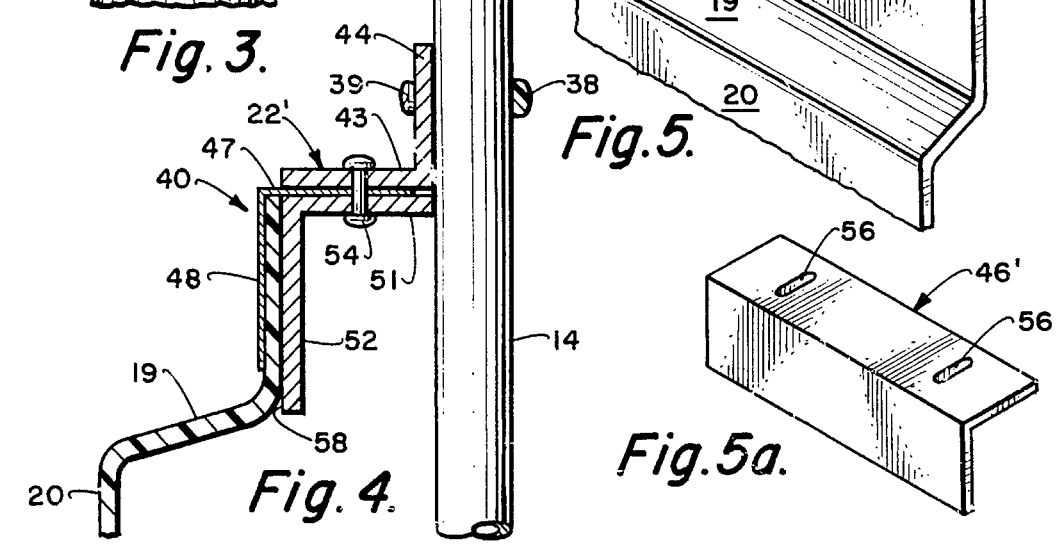

SHOWER PIPE SUPPORT

BACKGROUND OF THE INVENTION

1. Field of the Invention

The present invention relates to pipe supports used in construction and, more particularly, to a support for a shower head water supply pipe.

2. Description of Related Art

In the construction of homes and offices that include shower facilities, various attempts have been made to short-cut the positioning and securement of tub and shower piping within the wall of the building. In the past, measurements were taken between upstanding wall studs, a board was then cut and nailed into place. It was then drilled with holes to provide for the insertion of the desired pipes.

The above procedure is obviously time-consuming, costly and burdensome. As such, various attempts have been made to streamline this process. For example, in U.S. Pat. No. 2,537,437, a metal brace is nailed to spaced-apart wall studs. The brace is provided with U-bolts and large washers so that bathtub water supply piping can be held securely to the bracket by the U-bolts. The bracket has spaced-apart cross pieces allowing the U-bolts to slide axially for accommodating different types of faucets.

U.S. Pat. No. 2,661,483 accomplishes a similar purpose by utilizing L-shaped brackets nailed to the sides of upstanding wall studs. The brackets include upper and lower channel members for engaging a plate through which pipe sleeves extend. The sleeves include set screws for securing faucet pipes that extend therethrough.

To provide a bracket that can be adjusted transversely of the wall, U.S. Pat. No. 3,606,217 shows the use of slotted L-shaped brackets. The brackets are attached to spaced-apart wall studs and to a cross piece that holds the faucet pipes. In this way, the faucets can be moved inwardly or outwardly relative to the wall of the bathroom.

Upon considering each of the above pipe brackets, it is clear that they each entail as much time for fitment and installation as would be entailed if one simply cut a piece of wood and drilled holes through it. As such, the prior art has provided very little real savings in construction time and cost.

SUMMARY OF THE INVENTION

The present invention provides a pipe support that interconnects a water supply pipe with a preformed shower enclosure. By interconnecting the pipe directly to the enclosure, the need for cross pieces between wall studs is entirely eliminated. Thus, the invention obviates every type of wall stud bracket no matter how simple or adjustable it may be.

The pipe support of the invention comprises a body having forward and rearward corner portions. An upstanding clamp flange extends from the rearward corner portion and a wall flange extends downwardly from the forward corner portion. The wall flange is bifurcated to define a downwardly facing open channel which is adapted to fit over the upper edge of a preformed shower enclosure wall. The pipe support body has sufficient width to position the clamp flange adjacent the shower head water supply pipe. In this position, the water pipe may be easily secured to the clamp flange.

The pipe support of the invention may comprise a unitary molded part or it may be constructed of three angular members. When constructed of three angular members, they are arranged so that an upper leg of the first member will function as the clamp flange and the other two members will combine to form the bifurcated wall flange. Each of the other legs of the angular members are superimposed to form layered sections of the pipe support body. With the above invention, construction productivity is greatly enhanced whereby the pipe support is simply slipped over the upper edge of the shower enclosure wall and the upstanding water supply pipe is stationarily secured to the pipe support with a conventional connector means. This avoids the use of hammers, nails, saws and tape measures —all of which are labor intensive.

BRIEF DESCRIPTION OF THE DRAWINGS

FIG. 1 is an isometric view of the pipe support of the invention shown as one integral molded part.

FIG. 2 is a fragmentary side elevation view partially in cross-section of a modified construction of the pipe support of the invention interconnecting a shower head water supply pipe with the upper edge of a shower enclosure wall.

FIG. 3 is an enlarged top plan view taken along lines 3—3 of FIG. 2.

FIG. 4 is a cross-sectional view taken along lines 4—4 of FIG. 3.

FIG. 5 is an exploded isometric view of the pipe support shown in FIG. 2.

FIG. 5a is a alternative embodiment of the second angular member shown in FIG. 5.

DESCRIPTION OF THE PREFERRED EMBODIMENTS

The basic elements of the overall pipe support 10 of the invention are best illustrated by reference to FIG. 1. Therein, pipe support body 22 is shown having a forward corner portion 24 and a rearward corner portion 26. Preferably the corner portions are aligned to be longitudinally parallel to each other. They extend coextensively to define a predetermined length for the overall body. They also define a predetermined body width that is about equal to the distance between upper edge 12 of the shower wall and the upstanding water supply pipe 14.

Extending upwardly from the aforesaid rearward corner portion is clamp flange 28. The flange is generally plate-like with flat sides and a rectangular outline. Preferably the clamp flange extends at an angle of about 90 degrees from the plane of body 22. In this way, it will provide a flat surface for solid engagement with a corresponding portion of the aforementioned water supply pipe.

Extending downwardly from the forward corner portion is wall flange 30. The wall flange is bifurcated to provide a downwardly facing open channel 32. The channel is defined by an outer arm 34 which is spaced-apart from an inner arm 36. The arms are flat-sided and have an overall rectangular shape. They extend coextensively and parallel to each other.

The outer arm 34 extends about 90 degrees downwardly from the forward corner portion a distance sufficient to form an effective engagement with the shower wall upper edge when co-acting with the inner arm. The inner arm also extends about 90 degrees downwardly from the underside of body 22. It is separated from the outer arm a distance slightly greater than the thickness of the shower wall upper edge.

As so constructed, the pipe support can be moved downwardly over the shower wall upper edge at a predetermined position below the shower head. It may then be adjusted to a centered position with respect to upstanding pipe 14. In this position, a connector means is used to secure the pipe to the clamp flange.

As shown with respect to the embodiments of FIG. 2–5a, the connector means comprises a C-shaped pipe clamp 38 with clamp fasteners 39. The fasteners extend through openings in the clamp flange and engage corresponding openings in the pipe clamp in a conventional manner. It will be appreciated that other connector means could also be used. Examples are bent wire fasteners, adjustable plastic ties, U-bolts, adhesives and spot welds.

An advantageous feature of the invention is that it may be constructed of conventional readily obtainable parts. This feature will become apparent with reference to the pipe support illustrated in FIGS. 2–5a of the drawings. With particular reference to FIGS. 2 and 4, the overall pipe support is shown by reference 40. It comprises an assembly of a first angular member 42, a second angular member 46 and a third angular member 50. Each of the angular members have two adjoining rectangular-shaped flat-sided legs which diverge from each other. Their overall shape is similar to an angle iron.

The first angular member comprises a first body leg 43 from which extends an upper leg 44. This member comprises the top one of the three members in the pipe support assembly. It is oriented so that its upper leg will extend upwardly at the rearwardmost area of the pipe support. In this position it will function as the clamp flange. As so oriented, the body leg will comprise the uppermost layer of the overall pipe support body 22'.

Underlying the first angular member is second angular member 46. This member comprises a second body leg 47 from which extends outer leg 48. The second member is oriented so that outer leg 48 extends down at the forwardmost area of the pipe support. In this position, it functions as outer arm 34.

Also, second body leg 47 will be in contact with the underside of first body leg 43. It will be positioned so that it is coextensive with the outline of the first body leg. When arranged in this manner, the second body leg will comprise the middle layer of pipe support body 22'.

The third angular member is located beneath the second member whereby the third body leg will abut the underside of the second body leg. In this position, the third body leg will comprise the bottom layer of the body assembly 22'. The inner leg and body leg are preferably aligned to be parallel and coextensive with their second angular member counterparts. However, the inner leg 52 is located inwardly from outer leg 48 to create open channel 58.

Each of the body legs are secured together with releasable securement means shown as body fasteners 54. As best seen in FIG. 5, the fasteners extend through corresponding openings proximate the middle of the body legs of the first and third angular members. The fastener openings for the second angular member are closer to its inner edge 49 so that when assembled, outer leg 48 will be offset outwardly from inner leg 52. The offset distance is slightly greater than the thickness of upper edge 12.

To have the option of varying the width of channel 58, second angular member 46 is provided with a transverse adjustment means. As shown in FIG. 5a, such means comprise elongated slots 56 which are used in place of the original body fastener openings. The slots permit the second angular member 46' to be moved in or out relative to the first and third angular bodies. In this way, the width of open channel 58 will be varied to accommodate a variety of shower wall thicknesses.

It will be noted that each of the aforesaid inner and outer legs may have a greater width than the overall body width. This will permit a stronger more viable engagement with the shower wall upper edge. It will also be noted that the outer arm should have a thickness less than the width of lip section 19. This is to permit the application of tile, plaster or wall board against the arm without extending beyond the plane of wall 20.

Although each of the angular members may be constructed of cast metal or molded plastic, they can also comprise conventional angle iron parts. In either case, mass production techniques would be available to achieve the economics of high volume. It is also possible that the pipe support may constitute an integral part of the shower enclosure wall. Especially since many shower enclosures are molded structures.

While the invention has been described with respect to preferred embodiments, it will be apparent to those skilled in the art that various modifications and improvements may be made without departing from the scope and spirit of the invention. Accordingly, it is to be understood that the invention is not to be limited by the aforementioned specific illustrative embodiments, but only by the scope of the appended claims.

I claim:

1. A pipe support for interconnecting an upstanding pipe to a preformed shower wall having an upper edge which is spaced-apart a distance from the pipe comprising:

a pipe support body having a forward corner portion and an opposing rearward corner portion defining a width which is proximate the distance between said upper edge and said pipe;

a clamp flange extending upwardly from said rearward corner portion adjacent to said supply pipe; and, a wall flange extending downwardly from said forward corner position, said wall flange having a bifurcated structure comprising an inner arm spaced-apart from an outer arm defining an open channel for engagement with said upper edge.

2. The pipe support of claim 1 wherein said forward and rearward corner portions extend coextensively and parallel to each other.

3. The pipe support of claim 1 wherein said body portion comprises three layers and, said clamp flange and an uppermost layer of said body comprise the respective legs of a first angular member.

4. The pipe support of claim 3 wherein said outer arm and a middle layer of said body comprise the respective legs of a second angular member.

5. The pipe support of claim 4 wherein said inner arm and a bottom layer of said body comprise the respective legs of a third angular member.

6. The pipe support of claim 5 wherein said three layers are secured together by releasable securement means.

7. The pipe support of claim 6 wherein said inner and outer arms have a width that is greater than the width of said body.

8. The pipe support of claim 5 wherein said middle layer includes transverse adjustment means for varying the width of said open channel.

9. A pipe support that engages the upper edge of a shower enclosure wall for supporting a shower water supply pipe comprising:

a shower enclosure wall with an upper edge having a predetermined thickness;

an elongated body having a predetermined width and opposing longitudinal rearward and forward corner portions;

a clamp flange extending upwardly from the rearward corner portion; and, a bifurcated wall flange extending downwardly from the forward corner portion having an open channel for engagement with said upper wall edge.

10. The bracket of claim 9 wherein said bifurcated wall flange comprises an inner arm spaced-apart from an outer arm.

11. The bracket of claim 10 wherein said upper edge is offset backward from the shower enclosure wall by a lip section, said outer arm having a thickness that is less than the width of said lip section.

12. The bracket of claim 9 wherein said clamp flange comprises the upper leg of a first angular member, said outer arm comprises the outer leg of a second angular member, said inner arm comprises the inner leg of a third angular member.

13. The bracket of claim 12 wherein said first angular member includes a first body leg extending about 90 degrees from said upper leg, said second angular member includes a second body leg extending about 90 degrees from said outer leg and said third angular member includes a third body leg extending about 90 degrees from said inner leg.

14. The bracket of claim 13 wherein said body comprises said second body leg layered between said first body leg and said third body leg.

15. The bracket of claim 14 wherein said second body leg includes transverse adjustment means for changing the spacing between said inner arm and said outer arm.

* * * * *